Jan. 6, 1925.

A. J. NASH 1,522,315

SPRING HUB

Filed Dec. 20, 1923

Inventor
A. J. Nash
By
Attorney

Jan. 6, 1925.
1,522,315
A. J. NASH
SPRING HUB
Filed Dec. 20, 1923    2 Sheets-Sheet 2
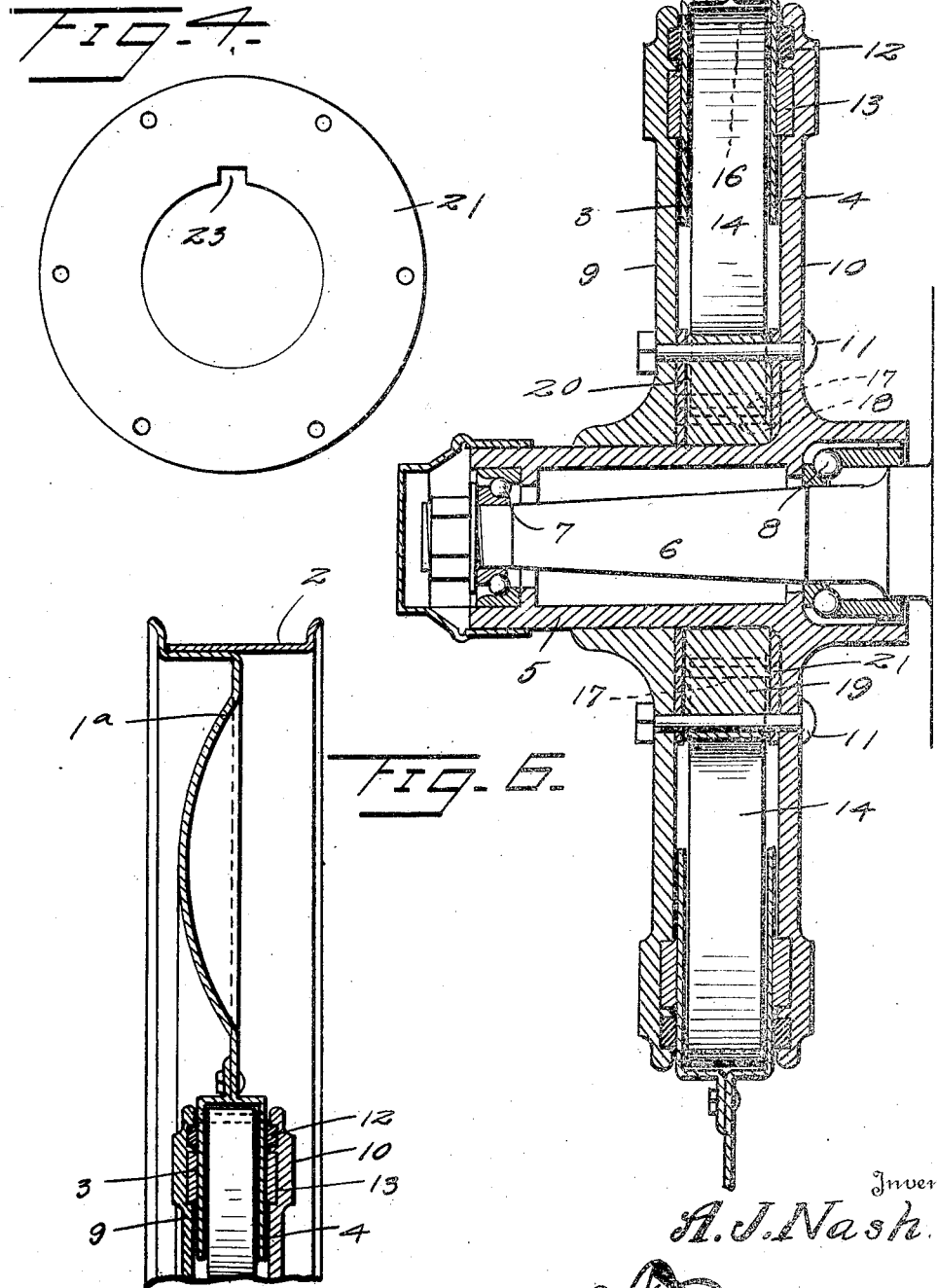
Inventor
A. J. Nash.
Attorney Patented Jan. 6, 1925.

1,522,315

UNITED STATES PATENT OFFICE.

ALVIN J. NASH, OF ALAMEDA, CALIFORNIA.

SPRING HUB.

Application filed December 20, 1923. Serial No. 681,811.

*To all whom it may concern:*

Be it known that I, ALVIN J. NASH, a citizen of the United States, residing at Alameda, in the county of Alameda and State of California, have invented certain new and useful Improvements in Spring Hubs; and I do hereby declare the following to be a full, clear, and exact description of the invention, such as will enable others skilled in the art to which it appertains to make and use the same.

The invention relates to vehicle wheels and more particularly to the hub structure which in the present instance is yieldable to neutralize shock and vibration and thereby minimize the wear and tear on the vehicle, motor and adjunctive parts besides adding to the comfort of the passenger or occupant of the vehicle.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to provided they fall within the spirit and scope of the invention.

Referring to the accompanying drawings forming a part of the application:

Figure 4 is an elevational view of one of the spoke retaining rings, Figure 5 is a detail perspective view of one of the spring spokes, and Figure 6 is a view similar to Figure 3 of a modification.

Corresponding and like parts are referred to in the following description and designated in the several views of the drawings by like reference characters.

Figure 1:
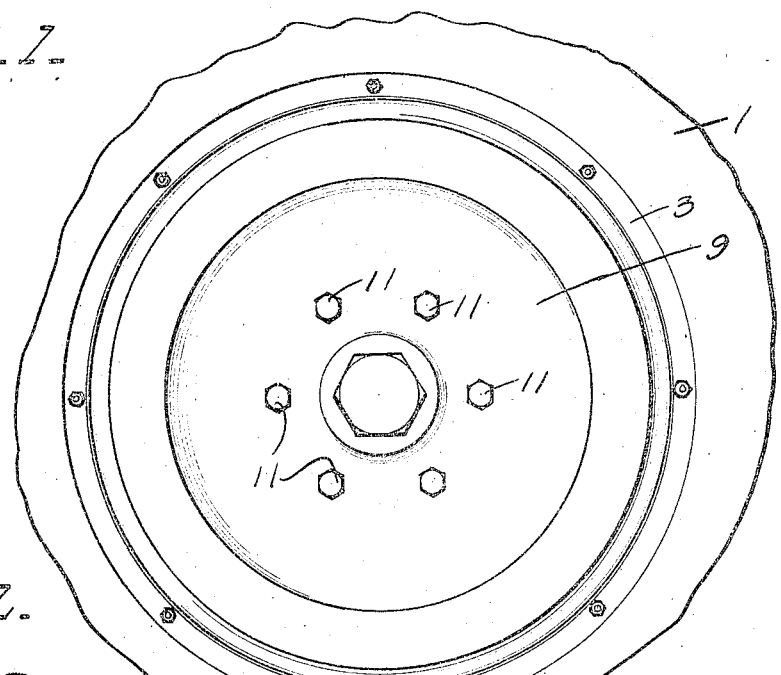
Figure 1 is a side view of a vehicle wheel embodying the invention.
Figures 2, 3:
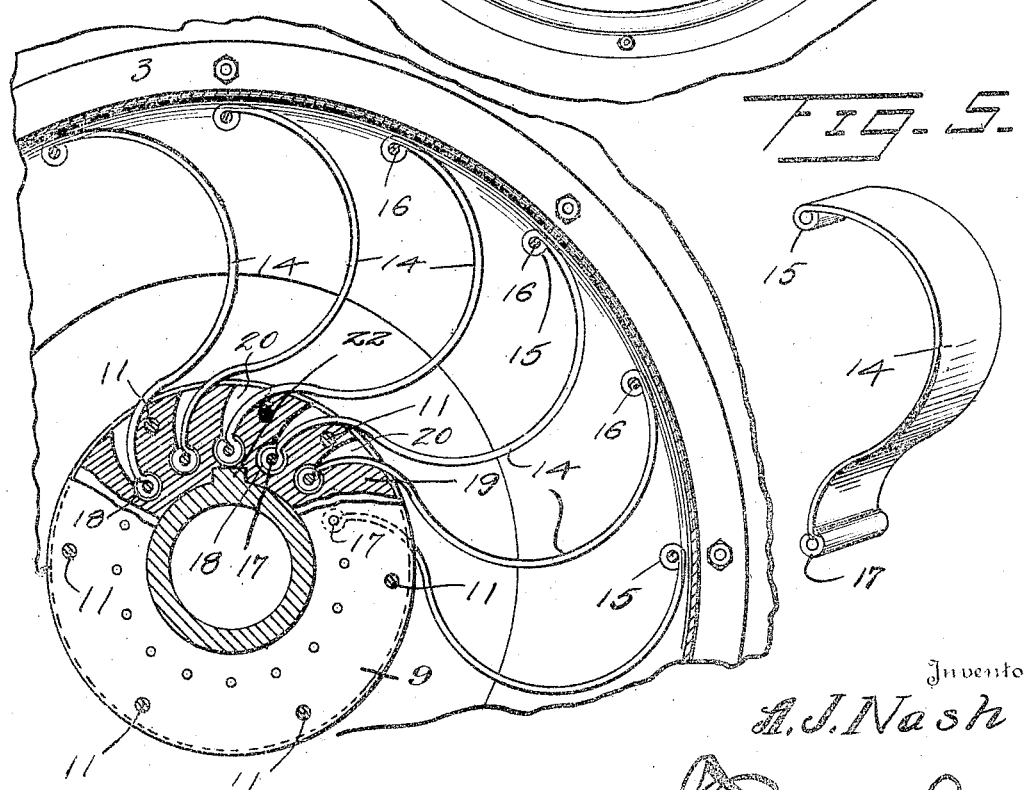
Figure 2 is an enlarged side view of the hub portion of the wheel, parts being broken away.
Figure 3 is a transverse sectional view of the hub portion.

The wheel illustrated is of the disk type and the disk 1 may be flat or straight, as indicated most clearly in Figure 3, or waved as shown most clearly at 1ᵃ in Figure 6. The tire receiving rim 2 may be of any construction. The disk is provided at its inner edge bordering upon the hub-receiving opening with parallel spaced elements 3 and 4 which have adjustable connection with the hub. The elements 3 and 4 are of annular formation and the one preferably forms a part of the disk whereas the other is separate and bolted or otherwise attached to the disk. The hub comprises a sleeve 5 and may be of any preferred construction to receive the axle arm 6 and the usual ball-bearings 7 and 8. The hub also includes the usual side plates 9 and 10, the latter preferably forming a part of the sleeve 5 and the plate 9 being separate and secured to the plate 10 by means of bolts 11. Each of the plates 9 and 10 is formed in its outer portion and upon its inner face with annular grooves or channels, the one receiving a packing 12 of felt or other analogous material and the other a wear ring 13 preferably of steel. The elements 3 and 4 are received between the outer portions of the plates 9 and 10 and obtain a close fit against the inner faces thereof. Spring spokes 14 are interposed between the hub and disk of the wheel and are connected at opposite ends thereto. The spokes are flat and curved throughout their length, being preferably of ogee form in edge view. An eye 15 is provided at the outer end of each of the spokes to receive a rivet 16 or like fastening, whereby it is connected to the outer portion of the elements 3 and 4. A pintle enlargement 17 is formed at the inner end of each of the spokes and is received in an opening 18 formed in a retainer 19 which is slipped upon the sleeve 5 and confined between the plates 9 and 10. Slots 20 extend outwardly from the openings 18 and are curved to correspond with the curvature of the inner ends of the spokes 14. By having the slots 20 flare outwardly, provision is had for a limited play between the inner ends of the spokes 14 and the retainer or holder 19, thereby preventing the crystallizing and the breaking of the spokes which would occur if the latter were rigidly connected to the holder 19. The openings 18 and slots 20 extend through opposite sides of the holder 19 and are closed at opposite sides by means of rings 21 which retain the spokes 14 in place. The spokes 14 are of a width to fit snugly between the elements 3 and 4 and the retainer rings 21. The sleeve 5 is formed with a rib 22 which is disposed to come between the side plates 9 and 10 and enter grooves 23 formed in the walls of the central opening of the holder 19 and also of rings 21, whereby the latter are prevented from rotary movement about the sleeve 5. The bolts 11 pass through registering openings formed in the holder 19 and rings 21.

It is observed that the spokes 14 are completely housed by the side plates 9 and 10 and the spaced annular elements 3 and 4 provided at the inner edge of the disk and are thereby protected and this housing may be supplied with a suitable lubricant whereby to minimize the friction of the moving parts, the packing 12 serving to prevent waste of the lubricant and to exclude dust and dirt and prevent the same entering the housing. The wear is sustained and resisted by means of the rings 13. When the plate 9 is removed, the disk and attached spokes may be readily removed or placed in position as required, and by having the openings 18 and slots 20 extend through opposite sides of the holder 19, the inner ends of the spokes may be readily fitted to or disconnected from the holder. It will thus be understood that the parts may be readily assembled and any disabled spoke may be easily and quickly replaced.

What is claimed is:

1. In a wheel hub structure side plates spaced apart and having annular grooves in the outer portion of their inner faces, a packing in the outermost groove, a wear ring in the next groove, spaced elements fitting snugly within the outer portions of said side plates and forming the inner portion of the outer part of the wheel, and spring spokes connecting the outer portion of the wheel with the hub and being disposed between the side plates and spaced elements.

2. A wheel hub structure comprising a sleeve, spaced side plates carried by the sleeve, the one forming a part thereof, a holder on the sleeve, a disk comprising spaced elements obtaining a snug fit between the outer portions of the side plates, and spring spokes having their outer ends disposed between the spaced elements and connected thereto and having their inner ends connected to the said holder and arranged between the said side plates.

In testimony whereof I affix my signature in presence of two witnesses.

ALVIN J. NASH.

Witnesses:
JOHN BLOCK,
DE WITT W. TOLL.